June 3, 1958 P. J. McGEE 2,837,607
HEARING AID DEVICES
Filed June 23, 1955
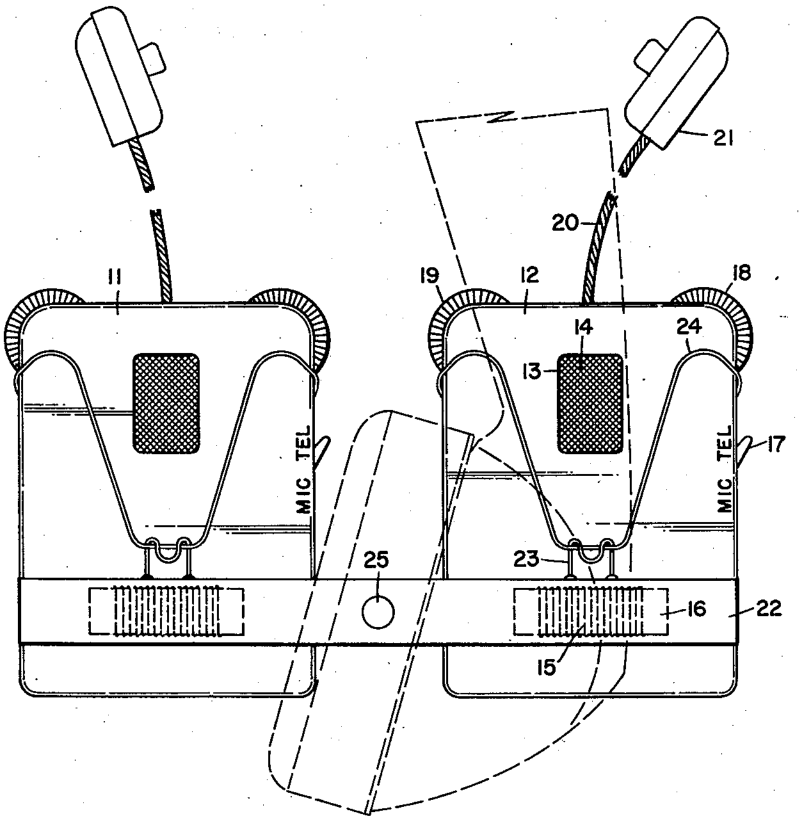
PAUL J. MCGEE
*INVENTOR.*
BY John J. Pederson
HIS ATTORNEY.

United States Patent Office 2,837,607
Patented June 3, 1958

2,837,607

HEARING AID DEVICES

Paul J. McGee, Chicago, Ill., assignor to Zenith Radio Corporation, a corporation of Illinois Application June 23, 1955, Serial No. 517,509

1 Claim. (Cl. 179—107)

This invention relates to hearing aid devices and more particularly to systems for obtaining balanced sound output from a pair of such devices.

Many people having hearing impediments wear two hearing aids, rather than one, to supplant their natural auditory loss. The employment of two hearing aids secures three important advantages which cannot be realized with the use of a single device. First, by employing two suitably placed instruments, a person with imperfect hearing can enjoy the reality of binaural hearing. Second, the user may adjust the two volume controls to different levels, thereby compensating for unequal hearing losses. Third, the user of two instruments operates each hearing aid at a lower volume level than that at which a single instrument normally functions.

Many hearing aids are provided with inductive pickup coils arranged to be switched into the amplifier input circuit in place of the microphone and adapted for magnetic coupling to a telephone receiver to obviate the necessity of employing of acoustic coupling with its attendant inconvenience and inefficiency. However, it is not feasible to provide simultaneous magnetic or acoustic coupling between a telephone receiver and two independent hearing aid instruments. Consequently, it may be necessary for an individual employing a pair of instruments to readjust the volume level of one of the instruments for telephone use, in addition to performing the switching operation to substitute the inductive pickup coil for the microphone in the input circuit; in some instances, the hearing loss may be so great that the maximum output obtainable from a single instrument is insufficient to permit adequate hearing assistance, and individuals with hearing losses of such severity are therefore unable to engage in telephone conversations. Moreover, even with less severe hearing losses, the required output from a single instrument may be above the threshold of discomfort, so that balanced operation is greatly to be desired.

It is an object of this invention to provide a balanced hearing aid arrangement comprising a pair of hearing-aid instruments adapted for simultaneous use in amplifying the output of a telephone receiver.

It is an additional object of the invention to provide such a balanced hearing aid arrangement in which the telephone receiver output may be unequally divided before amplification by the hearing aids, to compensate for unequal hearing losses.

In accordance with the invention, a hearing aid device adapted for balanced operation when employed in conjunction with a telephone receiver comprises two hearing aids, each including an inductive pickup coil adapted for magnetic coupling to the telephone receiver. The device also includes a ferromagnetic coupling element magnetically coupled to the inductive pickup coils of both of the hearing aids.

The features of the present invention which are believed to be novel are set forth with particularity in the appended claim. The invention, together with further objects and advantages thereof, may best be understood by reference to the following description taken in connection with the accompanying drawing, in which the single figure is a front view of an embodiment of the invention.

The drawing shows two identical hearing aid instruments 11 and 12, positioned substantially in the same plane and proximate to one another. Each has an aperture 13 for admitting sound waves through a grille 14 to a microphone (not shown). Each instrument is also provided with an inductive pickup coil 15 wound on a ferromagnetic bar 16, adjacent the front surface of each instrument; a switch 17, positioned on the hearing aid case, is arranged to selectively insert microphone 14 or pickup coil 15 in the input circuit of the amplifier (not shown). A volume control knob 18 and a tone control knob 19 are positioned in the upper corners of each hearing aid. From the top of each hearing aid, a cord 20 is connected to an earphone 21. These constructional features may be entirely conventional and are well understood in the art.

In accordance with the invention, a ferromagnetic coupling bar 22 is supported adjacent hearing aids 11 and 12 and in direct juxtaposition with and magnetically coupled to the pickup coil 15 of each instrument. Coupling bar 22 may be supported in the desired position in any suitable manner, as for example by means of hooks 23 adapted for suspension from the usual clothing clips 24 provided with the hearing aid instruments. A center dot 25 or other indicium may be provided to designate the central part of coupling bar 22.

In operation, when the user of hearing aids 11 and 12 desires to receive sound vibrations through microphones 14, switches 17 are placed in the MIC position, thereby connecting microphones 14 to the input circuits of hearing aids 11 and 12. When the reception of a telephone message is desired, switches 17 are displaced to the TEL position, connecting pickup coils 15 to the input circuits of their respective hearing aids in a conventional manner. The earpiece of the telephone receiver (shown in dotted outline) is placed adjacent center dot 25 of coupling 22, and the current flowing through the receiving coil of the telephone instrument gives rise to magnetic flux variations which, in accordance with the invention, are coupled through coupling bar 22 to pickup coils 15 of each hearing aid. When the telephone earpiece is held directly over center dot 25, the flux is evenly divided and, provided the volume control of each hearing aid is adjusted to the same level, sounds of equal intensity are reproduced in the two earphones. The telephone earpiece may be moved from center dot 25 to a position nearer pickup coil 15 of either hearing aid, thereby coupling more of the signal to the closer instrument and less to the farther; in this manner a slight movement of the telephone earpiece may be employed to compensate for unequal hearing losses in each ear. Thus the user of two hearing aids, when employing a telephone receiver to produce inductive coupling to the hearing aids, may preserve the compensation for unequal hearing loss afforded by two instruments and also maintain a lower volume level for each instrument.

In a particular construction of the invention, two identical hearing aids having inductive pickup coils were positioned approximately one and one-half inches apart. A coupling bar of cold rolled steel approximately seven inches long, one-eighth inch thick, and one-half inch in width was employed. Such a magnetic bridge afforded excellent results, and the division of the input signal to the two hearing aids was easily varied by moving the telephone receiver to the left and right of center dot 25. It is evident that no binaural effect can be achieved in this manner, but the advantages of unequal signal distribution to compensate for unequal hearing losses and low operating levels possible with two instruments are preserved by use of the coupling bar.

While a particular embodiment of the invention has been shown and described it is apparent that modifications and alterations may be made, and it is intended in the appended claim to cover all such modifications and alterations as may fall within the true spirit and scope of the invention.

I claim:

A hearing aid device adapted for balanced operation when employed in conjunction with a telephone receiver, comprising: a first hearing aid including an inductive pickup coil adapted for magnetic coupling to said telephone receiver; a second hearing aid including an inductive pickup coil adapted for magnetic coupling to said telephone receiver; and a continuous ferromagnetic coupling element having a first portion magnetically coupled to one of said pickup coils and a second portion, spaced from said first portion, magnetically coupled to the other of said pickup coils, whereby said telephone receiver may be magnetically coupled to said ferromagnetic coupling element at various locations intermediate said first and second portions to provide various conditions of balanced and unbalanced outputs from said hearing aids.

References Cited in the file of this patent

UNITED STATES PATENTS

| | | |
|---|---|---|
| 1,543,117 | Maxfield | June 23, 1925 |
| 1,552,590 | Allen | Sept. 8, 1925 |
| 2,530,621 | Lybarger | Nov. 21, 1950 |